July 6, 1948.   P. ROBINSON   2,444,880
ELECTRICAL SEAL
Filed Dec. 23, 1943
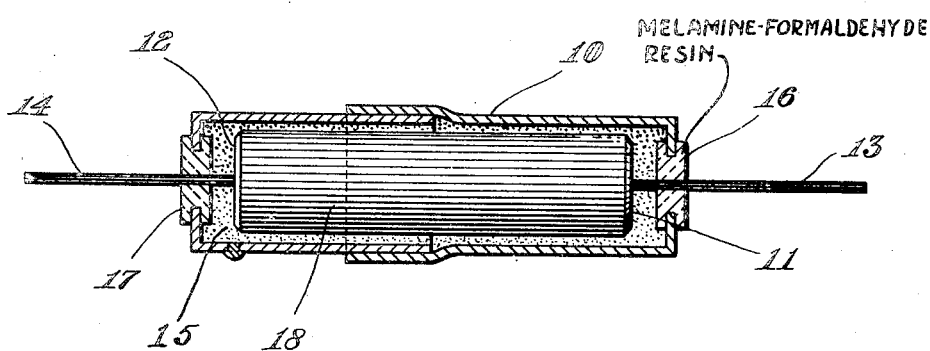
PRESTON ROBINSON
& PAUL H. NETHERWOOD
INVENTOR.
BY Arthur J. Connolly
ATTORNEY Patented July 6, 1948

2,444,880

UNITED STATES PATENT OFFICE 2,444,880

ELECTRICAL SEAL

Preston Robinson, Williamstown, and Paul H. Netherwood, North Adams, Mass., assignors to Sprague Electric Company, North Adams, Mass., a corporation of Massachusetts Application December 23, 1943, Serial No. 515,382

4 Claims. (Cl. 174—18)

This invention relates to improved electrical insulation and more particularly refers to improved insulated leads for condensers, resistors, and other electrical devices.

In manufacturing electrical equipment, such as electrical condensers and precision resistors, many problems are encountered in insulating leads and in providing permanent hermetic sealing of the units. The insulation of electrical leads from other electrical leads, from the container, etc., is an obvious necessity. For efficient and precision operation of condensers and resistors, hermetic and permanent seals are virtually indispensable. If a unit is not completely sealed, corrosive or humid atmospheres often will alter the electrical properties of the unit. The demands of present electrical equipment can be met satisfactorily only with permanently sealed units with insulated leads.

Of the numerous attempts in the prior art to pass an insulated lead through a metallic wall, such as the container of an electrolytic condenser, the most successful has been the various glass-to-metal seals wherein it is attempted to choose a glass with a coefficient of expansion matching that of the metal. This type of insulation and seal is satisfactory once it is safely installed on the apparatus on which it is intended to be used. However, in assembling the seal to the metal wall to which it is to be attached, the metal flange of the seal is soldered, brazed or otherwise treated to form a metal-to-metal seal by some process which inevitably involves heating of the flange. Under these circumstances, even though the metal flange and the glass have the same coefficients of expansion, the metal actually expands to a greater extent due to the fact that it has a higher thermal conductivity than the glass. This frequently results in rupture of the seal.

There have also been numerous attempts in the prior art to make seals wherein the glass is replaced by a synthetic resin as, for example, a thermosetting resin. The thermosetting resins, however, generally possess higher coefficients of expansion than the metal, and, at the same time, possess very poor heat conductivity. Thus, when a thermosetting resin is substituted for glass in the conventional glass-to-metal seal, an unsatisfactory seal is obtained. Also, the seal is likely to deteriorate further, even after it is finally assembled on the device.

It is an object of this invention to produce an electrically insulating seal which is not subject to the foregoing disadvantages and others which directly or indirectly result therefrom. It is a further object to produce an electrically insulating seal which is maintained unimpaired over a wide range of conditions. It is a further object to produce a permanent electrically insulating seal, employing thermosetting resins, which is tight at all temperatures below the molding temperature of the resin employed therefor. It is a still further object to produce a permanent electrically insulating seal which uses a melamine-formaldehyde resin as insulation. Another object is to utilize the properties of the melamine-formaldehyde and related resins, that were heretofore regarded as being undesirable, in order to produce improved seals. Additional objects will become apparent from a consideration of the following description and claims.

These objects are attained by molding a thermosetting resin on or about a metal surface in the manner to be hereinafter described. In a more restricted sense, the invention is concerned with an electrically-insulating seal comprising metal parts upon and/or about which a melamine-formaldehyde or related type resin has been molded, and permitted to further polymerize. In a still more restricted sense, this invention is concerned with an electrically insulating seal comprising a metal surface upon and/or about which a melamine-formaldehyde resin is molded, polymerized and shrunk, so that the metal part is under tension at all temperatures below the molding temperature. In its preferred embodiment the invention is directed to condensers, resistors and other electrical devices wherein the leads are permanently sealed by molding and curing a melamine-formaldehyde resin on a tinned metallic surface.

It has been discovered that if thermosetting materials are molded onto the metal parts of an electrical device, and cooled to the operating temperature, the resin shrinks and provides a seal which is tight at all temperatures encountered in use. Furthermore, by selecting the proper molding cycle, the resin will continue to polymerize and shrink after leaving the mold. While this property of continued polymerization and shrinkage over a period of years has been a serious drawback to the use of such resins in the prior art, it has been adapted to advantage in the present invention, as will hereinafter appear.

After affixing the aforesaid seal to a metal surface and while the metal surface is heated for soldering, brazing, etc., the heat is regulated to produce a further and substantially complete cure of the resin in the immediate vicinity of the metal, resulting in a further tightening of the seal and prevention of additional polymerization. This precludes the formation of cracks during subsequent operation. In this manner, a former disadvantage of thermosetting resins is adapted to enhance the ultimate product.

A preferred and surprising embodiment of this invention is the discovery that tinning of the metal surfaces to which the resin is to be bonded produces an unusually tight and durable seal. Tinning means applying pure tin to the metal surface, or applying thereto a tin alloy such as a soft solder composition. Melamine-formaldehyde resins, in particular, adhere to the aforesaid tinned surfaces with surprising tenacity.

Thermosetting resins and mixtures thereof which may be used as the molding materials, in accordance with the present invention, are exceedingly varied. Resins of this type which are contemplated for use herein are the phenol-formaldehyde, urea-formaldehyde, casein-formaldehyde resins and also those resins exhibiting thermosetting properties which are described in U. S. patent applications Serial No. 475,051, filed by L. A. Brooks on February 6, 1943, and Serial No. 507,276, filed by P. Robinson and S. O. Dorst on October 22, 1943, both now abandoned. Outstanding results have been obtained with the thermosetting resins of the melamine-formaldehyde type. Melamine-formaldehyde resins particularly exhibit pronounced shrinkage upon polymerization. As heretofore mentioned, the seals formed in accordance with this invention utilize this shrinkage to form a permanent seal. Most importantly, this shrinkage is stopped at the optimum stage by suitable curing of the resin, as aforesaid.

Further, the melamine-formaldehyde resins are miscible with oils used, for example, in impregnating electrical condensers. Thus, it is possible to provide permanent seals about oil-impregnated electrical condensers. Previously the residual oil on the metal or other surfaces of the condenser unit would not dissolve in the molding compound and would form weak spots or cleavage planes in the molded insulation or seal. The resin may, of course, contain a filler of ground mica, asbestos, cotton linters, rags, fibre, metal oxides and/or similar insulating compounds.

The flanges, parts or surfaces to which the resin is bonded may be of any metal and are preferably tinned, although good results have been obtained by utilizing untinned metals. The metals are advisably disposed so that the resin will shrink thereon and produce a tight, permanent seal. The metal surfaces need not be cleaned with acid, solvents, or other cleansing agents prior to bonding of the resin thereon since an oil film will not interfere with formation of a permanent bond. Of course, cleaned surfaces, free from oil, may be employed if desired.

The invention will now be further described with reference to the appended drawing, which represents a tubular condenser unit embodying the aforesaid sealing means.

In this drawing, 18 is a rolled paper condenser unit, non-inductively wound so that the respective electrode foils protrude from opposite sides of the dielectric spacer. Each protruding edge is imbedded in solder, 11 and 12, as are the electrical leads 13 and 14. These leads may be of any electrically conducting metals, generally copper, and preferably tinned where they come in contact with the resin bonding medium. 10 is a metal housing for the aforesaid unit, preferably tinned at least, upon the surfaces which come in contact with the resin bonding medium. Either one or both ends of the metal housing 10 through which the electrical leads extend may be assembled by soldering or other suitable means to the longitudinal or cylindrical portion of the housing 10 following the insertion of the condenser unit 18 therein, if so desired. 15 is a wax, oil or resin impregnant, customarily incorporated in condenser units of this type. The resin seal is represented by 16 and 17. It is to be understood, of course, that the seal 16 and 17 could be made about a hollow metal insert or a standard electrical terminal lug. In such a case, the electrical leads 13 and 14 would be thrust through the insert and soldered thereto.

By means of the present invention condensers, resistors and other electrical devices may be produced with permanent hermetic seals. This is due to the selection of certain types of resin bonding materials and molding thereof around the metal surface and polymerized to the optimum stage before completion of the unit. At the same time, further polymerization with consequent shrinkage and rupture during operation of the unit is substantially entirely prevented.

The remarkable permanence and strength of the bond between tinned surfaces and the aforesaid thermosetting resins generally, and melamine-formaldehyde resins particularly, may be due to one or more of several actions, although the exact reason therefor is not fully known. It may be due to the fact that at the melting point of the tin the resin either reduces the metal oxides or dissolves them. It may also be due to the compatibility between the resin and the oil on the tinned surface. In any event, the bond between the resin and the tinned surface is surprisingly superior to prior art seals of this type.

As many different embodiments of this invention may be made without departing from the spirit and scope hereof, it is to be understood that the invention is not limited to the specific embodiments hereof except as defined in the appended claims.

We claim:

1. An electrical lead which is insulated from and permanently joined to a metal sheet through which it passes by a molded melamine-formaldehyde resin which has been shrunk on and about said metals and substantially entirely polymerized by the heat treatment to which it was subjected during the molding and sealing operation.

2. The articles of claim 1 wherein the metal surfaces to which the resin is bonded are tinned.

3. An electrical condenser comprising rolled electrodes insulated from each other and connected to separate terminals, said condenser being enclosed in a metallic housing, said housing being insulated from the terminals of said condenser by a molded melamine-formaldehyde resin which has been shrunk on and about said metals and substantially entirely polymerized by the heat treatment to which it was subjected during the molding and sealing operation.

4. The electrical condenser of claim 3 wherein the metal surfaces to which the resin is bonded are tinned.

PRESTON ROBINSON.
PAUL H. NETHERWOOD.

(References on following page)

REFERENCES CITED

The following references are of record in the file of this patent:

UNITED STATES PATENTS

| Number | Name | Date |
|---|---|---|
| 1,693,365 | Boyle | Nov. 27, 1928 |
| 2,017,204 | Fisher et al. | Oct. 15, 1935 |
| 2,197,357 | Basel | Apr. 16, 1940 |
| 2,199,803 | Light | May 7, 1940 |
| 2,222,748 | Komives | Nov. 26, 1940 |
| 2,229,291 | Groten | Jan. 21, 1941 |
| 2,243,881 | Peters | June 3, 1941 |
| 2,256,897 | Davidson | Sept. 23, 1941 |
| 2,325,105 | Bruson | July 27, 1943 |
| 2,328,825 | McMahon | Sept. 7, 1943 |
| 2,365,926 | Zoerlein | Dec. 26, 1944 |

FOREIGN PATENTS

| Number | Country | Date |
|---|---|---|
| 284,897 | Great Britain | Feb. 9, 1928 |
| 329,215 | Great Britain | May 15, 1930 |